May 13, 1958 C. A. SEGERSTROM ET AL 2,834,833

ELECTRONIC COMMUTATED CHANNEL SEPARATORS

Filed Nov. 21, 1952 3 Sheets-Sheet 1

INVENTORS
CARL A. SEGERSTROM
CONRAD H. HOEPPNER
ANTHONY ABATE
BY Elmer J. Gorn
ATTORNEY

ELECTRONIC COMMUTATED CHANNEL SEPARATORS

INVENTORS
CARL A. SEGERSTROM
CONRAD H. HOEPPNER
ANTHONY ABATE
BY Elmer J. Gorn
ATTORNEY

ELECTRONIC COMMUTATED CHANNEL SEPARATORS

Filed Nov. 21, 1952 3 Sheets-Sheet 3

INVENTORS
CARL A. SEGERSTROM
CONRAD H. HOEPPNER
ANTHONY ABATE
BY Elmer J. Gorn
ATTORNEY United States Patent Office 2,834,833

Patented May 13, 1958

2,834,833

ELECTRONIC COMMUTATED CHANNEL SEPARATORS

Carl A. Segerstrom, Winchester, Conrad H. Hoeppner, Weston, and Anthony Abate, Waltham, Mass., assignors to Raytheon Manufacturing Company, Newton, Mass., a corporation of Delaware Application November 21, 1952, Serial No. 321,754

6 Claims. (Cl. 179—15)

Figure 1:
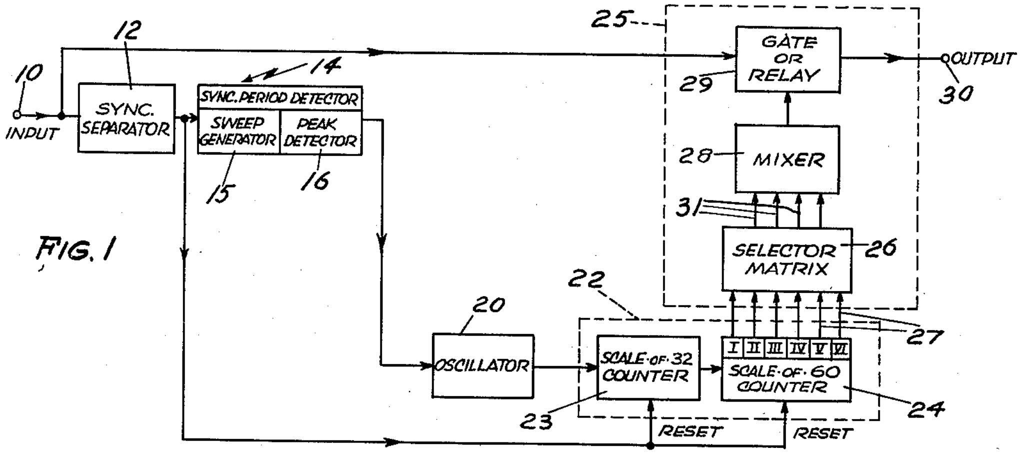

This invention relates to an electronic commutated channel separator adapted to select one or more channels of information from the total number of channels contained in a commutated channel input.

Commutation in a remote transmitting equipment may be accomplished by a rotary commutator having a number of segments $n$ equal to the number of channels of information available and driven at a speed which may be, for example, of the order of four to eight revolutions per second. One segment of the commutator is connected to a constant negative voltage used for synchronizing purposes while the remaining segments are connected to the signal outputs of the various channels. The remote receiver output for each frame or revolution of the commutator thus consists of negative-synchronizing pulses recurring at a frequency of the order of four to eight C. P. S. and, between each adjacent synchronizing pulse, ($n$—1) equally spaced positive amplitude modulated signal pulses. The amplitude of each positive signal or channel pulse corresponds to the signal from one commutated channel.

In order to selectively separate a desired channel or channels from the $n$ channels available, the frame period between synchronizing pulses is divided into $n$ equal time intervals, any of which may be selected and used to gate out the pulse corresponding to that channel. Since the synchronizing period is continually changing owing to slight variations in speed of the remote mechanical commutating switch, the division of the frame-synchronizing period into $n$ equal time intervals is difficult.

In accordance with this invention, the input signal containing the $n$ channel is first introduced into a synchronizing-separator circuit which separates out the synchronizing pulses. The period of the synchronizing pulse is next converted into a voltage by means of a period detector which is used as a frequency control for an oscillator whose frequency is thus maintained at substantially $m$ times the frame-synchronizing period. The controlled oscillator output is counted down by a factor of $m$ by means of a counter chain so that the output of said counter has a frequency substantially equal to the frame synchronizing pulse recurrence rate. The channel separator further comprises a counter-matrix circuit driven by the controlled oscillator. By proper matrix connections to the controlled divider, it is possible to generate gate pulses at the correct times necessary to select the data from a desired commutator segment. In one embodiment of the invention, as many as $n$—1 channels (the exact number depending upon the matrix arrangement) may be separated out simultaneously and brought out sequentially over one lead. In another embodiment of the invention, the $n$—1 channels may be selectively brought out to separate output terminals.

The counters are reset directly during each synchronizing period by negative-synchronizing pulses obtained at the output of synchronizing separator 12. The selected amplified gate pulses from the matrix corresponding in time to the desired channel(s) to be transmitted, operates a gate circuit such as a high-speed relay which allows only the desired channel or signal pulses to reach the output terminals of the channel separator.

Figure 4:
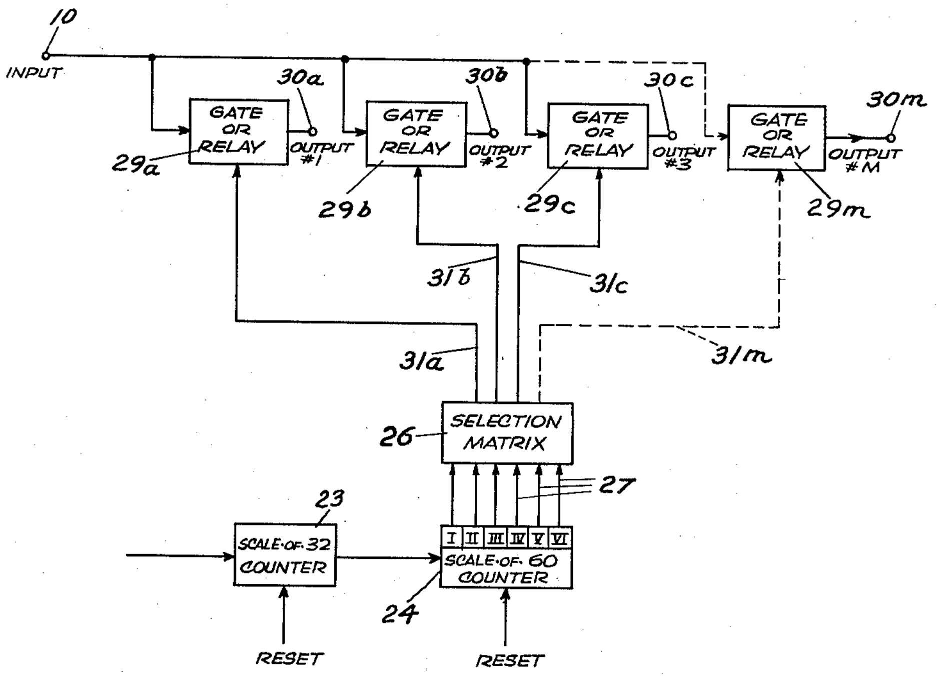
Figure 2:
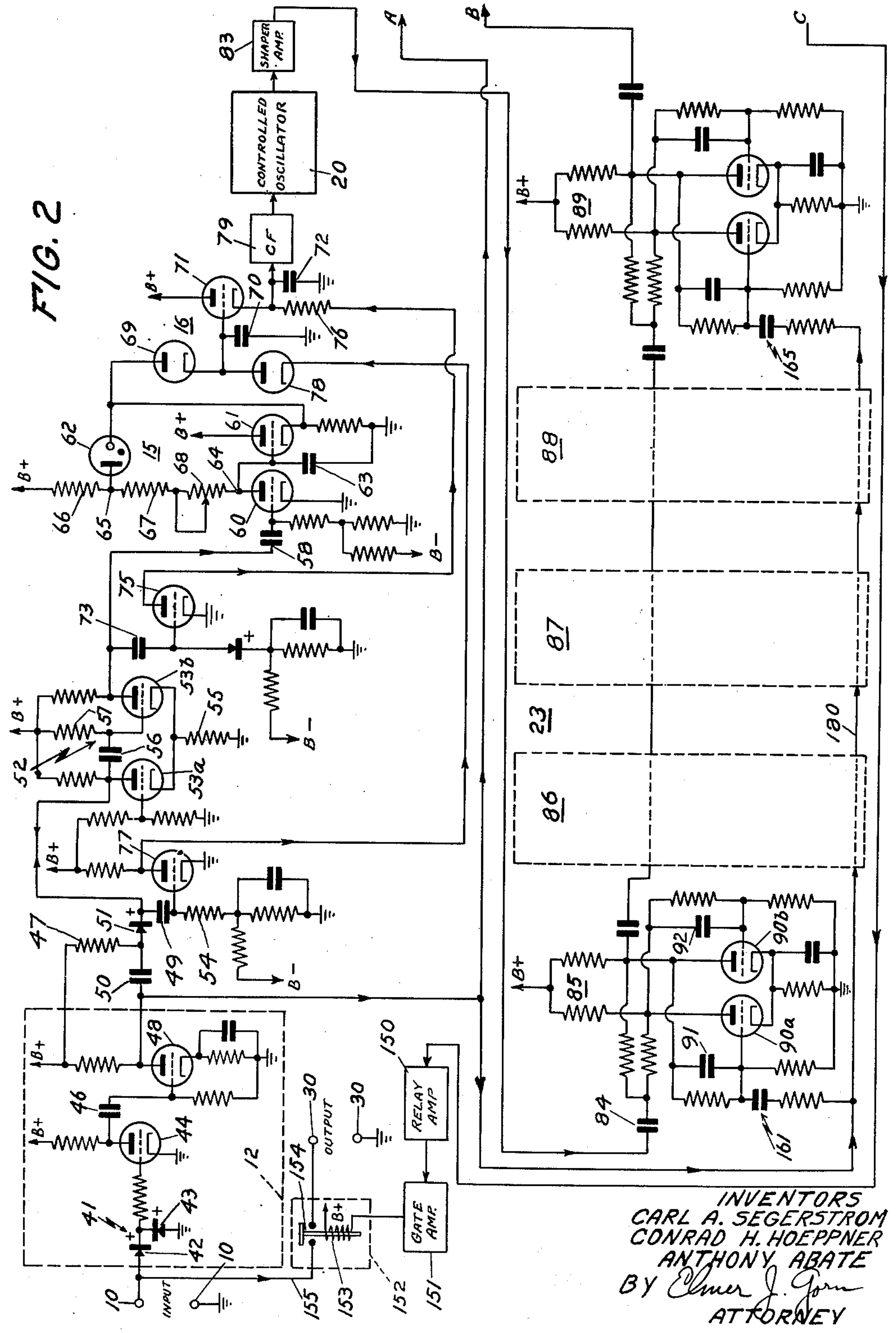
Figure 3:
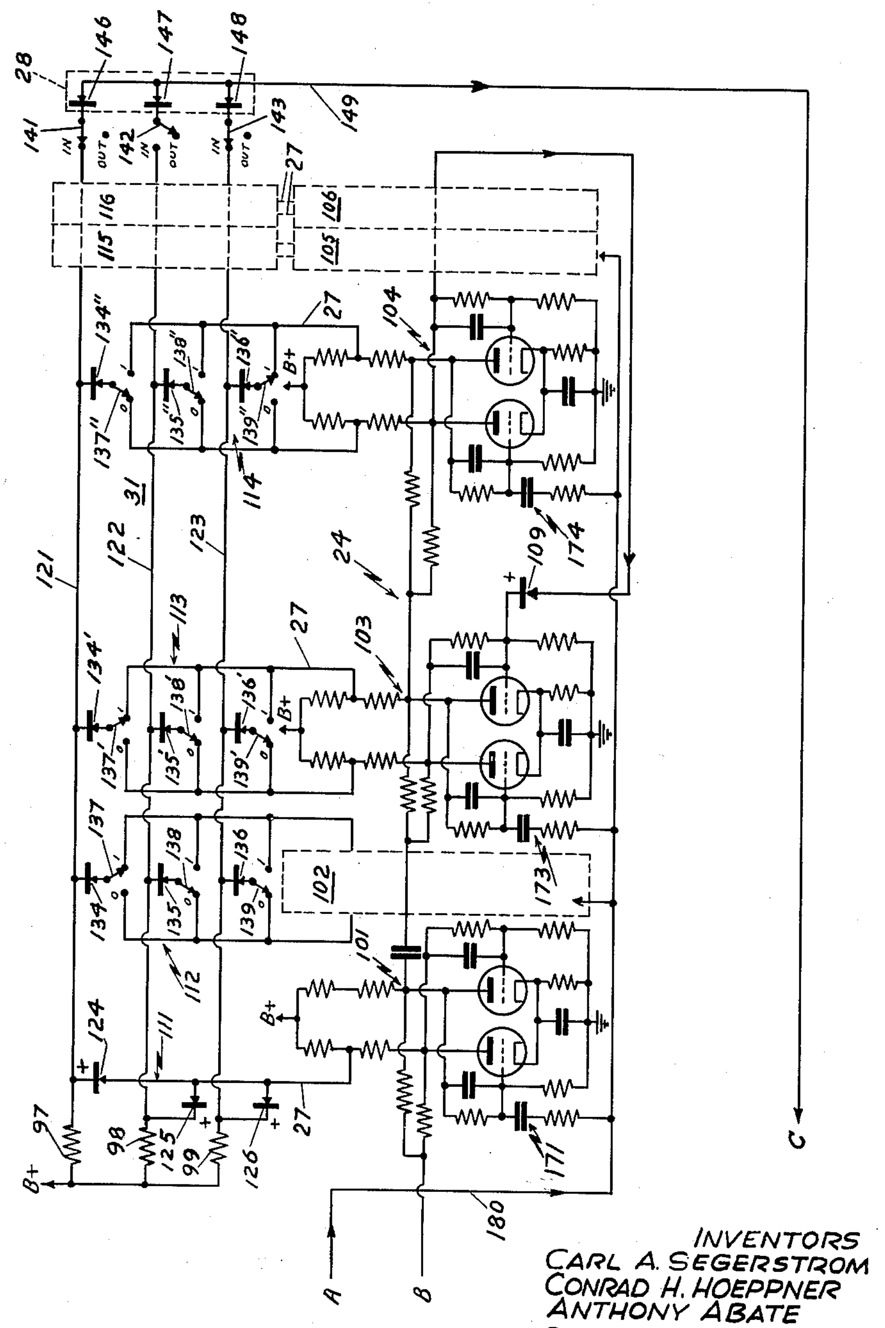

In the drawings:

Fig. 1 is a block diagram of a first embodiment of a commutated channel separator in accordance with the subject invention;

Figs. 2 and 3 together constitute a composite block and circuit diagram of the channel separator described in Fig. 1; and Fig. 4 is a fragmentary block diagram showing a second embodiment of the subject invention.

Referring to Fig. 1, the input signal from the telemetering receiver applied to the input terminal 10 of the channel separator is introduced into synchronizing separator circuit 12 which separates out the synchronizing pulses from the remaining channel pulses contained in the input signal and reshapes these pulses. The period of the synchronizing pulse is converted into a voltage in the synchronizing period detector 14 by means of a linear sawtooth sweep generator 15 and peak detector 16. This voltage is used as a frenquency-control voltage for controlled oscillator 20 which may be a multivibrator or some form of reactance tube modulated oscillator.

The output pulses from controlled oscillator 20 are applied to the input of a counter chain 22 including a scale-of-32 counter 23 followed by a scale-of-60 counter 24. The output pulses from the last stage of counter 24 recur at a frequency which is very nearly equal to the frequency of the frame-synchronizing pulses.

The scale-of-60 counter 24 divides the frame-synchronizing period into sixty equal segments, each even segment of which corresponds to one of the signal channels. The output of counter chain 22 is applied to a selection matrix 26 in a channel selection circuit 25. Selection matrix 26 is tied in with various stages of counter 24 by selector leads 27 and selects gate pulses from counter 24 corresponding to the desired channel segments. Selection is accomplished by means of a number of switches included in matrix 26 which connects individual diode matrix elements (not shown) to the output circuits of a like number of stages of counter 24.

Matrix 26 includes a plurality of identical matrix buses 31 equal in number to the maximum number of channels which are to be simultaneously selected. If, for example, only one channel is to be selected, at one time, only one matrix bus need be used. Matrix 26 may be considered as a coincidence circuit in that a given matrix bus will rise in voltage only when all of the diodes of the individual matrices are connected to counter stage output circuits whose potential is rising.

Knowing the manner in which counter 24 cycles, it is possible by means of the aforesaid switches in matrix 26 to select a combination of counter stages whose output circuits rise in potential coincidentally with the desired channel segment. The gate pulses produced on one or more of the matrix buses 31 are combined in mixer 28 and are used to close a gate circuit 29 inserted between the input terminal 10 and output terminal 30 and thereby allow only the desired channels to reach the output terminal 30 of the equipment.

Referring to Figs. 2 and 3, which are arranged in a line from left to right in the order named, the incoming signal at input terminals 10, 10 comprises channel data in the form of positive-going channel pulses and negative-going synchronizing signals. If, for example, the frame-synchronizing frequency is four pulses per second and the number of channels including the synchronizing channel is 30, the interval between frame-synchronizing pulses is 250 milliseconds and the duration of each channel will be 8.3 milliseconds. It should be understood that the values recited are merely illustrative, since any desired number of channels may be located between adjacent synchronizing pulses and the spacing between the various channel pulses may be varied, depending upon the configuration of the mechanical commutator used in conjunction with this system.

The synchronizing signals applied to synchronizing separator and shaper circuit 12 are separated from the channel data by synchronizing separator 41 consisting of two diodes 42 and 43 connected back-to-back and an amplifier tube 44. Only the negative-going synchronizing signals are theoretically capable of passing through diode 42 to the grid of amplifier 44; in the event that some positive-going signals do reach junction point 45, however, they are shunted to ground by way of diode 43. The negative-synchronizing pulses thus separated out are amplified by amplifier 44 and coupled by way of capacitor 46 to an amplifier-shaper stage 48 whose output consists of negative-synchronizing pulses with sharp leading edges. The synchronizing pulses from the plate of tube 48 are differentiated by resistor 47 and capacitor 50 and the negative portion or spike of the differentiated waveform passes crystal diode 51 to the plate of tube 53*a* of delay multivibrator 52 which is a basic cathode-coupled monostable multivibrator, such as described on pages 168 to 172 of "Waveforms" by Chance et al., published in 1949 by the McGraw-Hill Book Company, Inc. as volume 19 of the M. I. T. Radiation Laboratory Series. Crystal diode 51 limits the positive overshoot by virtue of its high back-to-front resistance to positive pulses. Briefly, the initial and stable state is with section 53*b* conducting and section 53*a* nonconducting. Stage 53*b* is conducting because its grid is tied to B+ through resistor 57 causing the grid of stage 53*b* to overcome cathode bias and pass sufficient plate current through its cathode resistor 55 to raise the cathode potential towards that of the grid so that stage 53*b* operates near zero bias. Stage 53*a* is nonconductive because of the negative bias resulting from plate current flowing from conducting stage 53*b* through common cathode resistor 55.

When the negative synchronizing pulses, coupled through capacitor 56, reach the grid of section 53*b*, they drive the grid negative, cutting off the stage, and abruptly interrupting the flow of plate current through cathode resistor 55. This removes the negative bias opposing the positive bias on the grid of stage 53*a* and permits conduction. The plate potential of stage 53*a* then drops and passes a negative pulse to the grid of stage 53*b*, which further holds it nonconducting. When stage 53*a* starts to conduct, its plate current also flows through cathode resistor 55 and again produces a negative drop in potential on the grid of stage 53*a*. However, since a self-biased tube cannot be cut off by itself, stage 53*a* will remain conductive until cut off by some other means. Stage 53*b*, however, will not remain indefinitely nonconductive because the potential at the grid of stage 53*b* will rise downward B+ as fast as the time constant of capacitor 56 and resistor 57 will permit. This will eventually raise the potential at the grid of stage 53*b*, causing the current through resistor 55 to increase, increasing the bias from grid to cathode of stage 53*a* beyond its cutoff. Hence, the monostable multivibrator 52 reverts to its original condition.

The positive pulses from the plate of stage 53*b*, which are of the order of two milliseconds, are applied by way of capacitor 58 to the input circuit of a bootstrap sawtooth generator 15 consisting of tubes 60, 61 and 62 and associated circuitry. A cathode follower 61 is used in conjunction with sawtooth generator tube 60 to obtain the desired linearity of the sawtooth voltage and the grid of tube 61 is directly coupled to the plate circuit of tube 60. The output of cathode follower 61 is coupled back to the plate circuit of tube 60 through neon tube 62.

The two millisecond positive gates whose leading edges correspond to the leading edges of the frame-synchronizing pulses, and which arrive at the grid of tube 60, cause the potential at point 64 to drop abruptly, discharging capacitor 63. At the end of the positive gate, tube 60 is cut off to allow capacitor 63 to charge through resistors 68, 67 and 66 to B+.

When capacitor 63 of tube 60 begins to charge, the rise in potential of point 64 is fed to the grid of cathode follower 61. The increased plate current in tube 61 causes the cathode to rise substantially the same amount as the grid, provided the amplification of the cathode follower is close to one. Thus, the cathode of tube 61 feeds back to the junction point 65 between plate resistors 66 and 67 the same increase in potential that point 64 originally experiences. A constant potential difference is thus maintained across points 64 and 65 during the charging cycle with the result that a constant current is established in resistors 67 and 68. This constant current through resistive elements 67 and 68, capacitor 63 and ground charges capacitor 63 at a constant rate so that the potential across this capacitor will rise linearly with time to produce the desired linear sawtooth voltage.

Potentiometer 68 is a sweep slope control potentiometer whose purpose is to vary the rate of charge of capacitor 63 to compensate for tube and circuit constants.

Each frame-synchronizing pulse, therefore, triggers a linear sawtooth wave whose maximum level appears across capacitor 70 of a standard peak detector 16 including charging diode 69 and capacitor 70. The voltage appearing across detector capacitor 70 is a direct function of the period between adjacent synchronizing pulses. This voltage across capacitor 70 is transferred to capacitor 72 through transfer cathode follower 71 during the two-millisecond periods immediately following the leading edge of each frame-synchronizing pulse.

The operation of the transfer cathode follower is as follows. The positive two-millisecond pulses derived at the plate of section 53*b* of multivibrator 52 are also fed by way of capacitor 73 to a resistance triode 75, causing it to conduct. The negative output thus obtained from the plate of triode 75 is applied to the cathode of transfer cathode follower 71 through cathode resistor 76, thus changing the cathode return of cathode follower 71 from a virtual open circuit, corresponding to the nonconductive condition, to about 10,000 ohms. This is equivalent to a switch in the cathode return, allowing cathode resistor 76 to be grounded through normally nonconductive tube 75 during the two millisecond gate pulse from multivibrator 52. Prior to this switching action, all circuits across capacitor 72 are virtually open circuited so that no discharge may occur between the two-millisecond pulses. When switching occurs, the voltage across capacitor 70 is transferred substantially through cathode follower 71 to capacitor 72.

At the end of the two-millisecond period, the positive pulse appearing at the plate of stage 53*a* is differentiated by the circuit comprising capacitor 49 and resistor 54 so that a substantial positive spike corresponding to the leading edge of the aforesaid positive pulse appears at the grid of tube 77 causing its plate potential to drop abruptly. The plate of tube 77 is tied to cathode of diode 78; thus discharge amplifier 77 discharges peak detector capacitor 70 through discharge diode 78 at the end of the two-millisecond interval.

Summarizing, the waveform from delay multivibrator 52 drives resistance triode 75 in the cathode circuit of cathode follower 71 which enables the normally-open cathode circuit to close so that cathode follower 71 may charge or discharge capacitor 72 depending on the change in charge across capacitor 70. If capacitor 70 is charged to a higher voltage than capacitor 72, then cathode follower 71 charges capacitor 72 to the level of capacitor 70. The discharge of capacitor 70 of the peak detector is effected by means of triode 77 and discharge diode 78 at the time the grid of tube 77 receives a positive pulse via capacitor 49 from the plate of tube 53a of multivibrator 52. The leading edge of the positive pulse corresponds to the trailing edge of the two-millisecond delay pulse.

The voltage on capacitor 72 is applied to cathode follower 79 whose output is a frequency control voltage for controlled oscillator 20.

Controlled oscillator 20 may be a multivibrator or some form of reactance tube modulated oscillator whose frequency is held at 1920 times the frequency of the frame-synchronizing pulses.

The output pulses from control oscillator 20 are amplified and shaped by stage 83 and applied via capacitor 84 to the input of a scale-of-32 counter 23 consisting of five cathode coupled bistable multivibrators 85 to 89, which are ordinary scale-of-2 multivibrator circuits having two plate-to-grid couplings and a common bias arrangement between the two halves of the circuit, whereby the stage as a whole remains in either one of its two stable states until the application of a negative input pulse to one of the tube grid circuits of each multivibrator. This basic circuit is shown in Fig. 5.6 on page 166 of "Waveforms" by Chance et al., previously referred to. Although the basic operation of this circuit is well known, a brief description of its operation is presented below.

In the absence of any negative-synchronizing pulses to the input of the scale-of-32 counter, the left-hand section of each stage is nonconductive and the right-hand section of each stage is conductive. If, for example, a negative-synchronizing pulse is applied to the grids of both sections 90a and 90b of the first stage 85, this pulse will have no effect on the left-hand section 90a of stage 85 since it is already nonconductive. The application of a negative pulse to the grid of the right-hand section 90b of stage 85 will, however, cut off this section, making its plate become more positive and, through capacitor 91, the grid of the left-hand section 90a swings positive. If this left-hand section begins to conduct, its plate swings negatively and the negative pulse coupled to the grid of section 90b through capacitor 92 causes this right-hand section 90b to cut off. Each successive negative synchronizing input pulse will reverse the operating state of the initial stage. The positive pulses will not affect the condition of the succeeding stage of the counter since the constants of the multivibrator circuitry and the values of the operating voltages are selected so that positive pulses of amplitude equal to that of the negative pulses will not overcome the bias then existing on the nonconductive section of the stage.

The output of the right-hand section 90b of initial counter stage 85 of the scale-of-32 counter 23 is coupled to the grids of second stage 86 which is identical with the first stage. Initially, the right-hand section of second stage 86 is the conductive section so that the second stage can be triggered into its opposite state only when the right-hand section of the first stage is nonconductive. In other words, when positive pulses appear at the plate of the right-hand section of a given stage, the succeeding stage is unaffected, whereas negative-going pulses appearing at the plate of the right-hand section of a given stage, corresponding to the condition of the change of state from nonconduction to conduction, are capable of triggering the following stage. The third counter stage 87 differs from the remaining stages only in the arrangement of its reset circuit which will be described later.

For every thirty-two pulses from controlled oscillator 20 appearing at the input of the scale-of-32 counter, a single negative pulse is derived at the output of the last counter stage. In other words, during each frame-synchronizing period approximately 60 pulses from oscillator 20 are derived from output stage 89, provided, of course, that the frequency of oscillator 20 is properly controlled by the frequency control circuit.

The output of the scale-of-32 counter 23 drives a scale-of-60 counter 24 comprising a series of six bistable multivibrators 101 to 106, inclusive, which are conventional binary counters differing from those of the preceding scale-of-32 counter 23 only in choice of circuit constants. A feedback loop from the output of the sixth stage 106 of the scale-of-60 counter through diode 109 to the third stage 103 thereof serves to convert what would normally be a scale-of-64 counter into the desired scale-of-60 counter.

The output pulses from the last stage 106 of the scale-of-60 counter recur at a frequency $1/1920$ times the frequency of the control oscillator, and, since the latter is maintained in synchronism with 1920 times the synchronizing frequency by means of the frequency control circuit previously described, the output pulses from stage 106 recur at nearly the same rate as the synchronizing pulses. In the particular application described, there are thirty channels, including the synchronizing pulse, contained in the commutated main channel input to the channel selector. Each channel including the synchronizing pulse then occupies $1/30$ of the total period between adjacent synchronizing pulses and the interval between successive channels corresponds to sixty-four periods of oscillation of oscillator 20. The channel separator according to the invention may operate with any number of channels subject only to obvious redesign of the number of counter stages and the selection matrix associated with the counters.

The scale-of-32 counter is so arranged that the various stages thereof resume their original electronic state or condition after thirty-two pulses have been received from oscillator 20. Since this counter is effectively reset to zero at the beginning of each synchronizing pulse, the states of the counter stages at the beginning of each channel pulse (every sixty-four input pulses from oscillator 20) are identical. Thus, at the beginning of each channel pulse, the left-hand sections of all stages of the scale-of-32 counter 23 are nonconductive and the right-hand section of all stages are conductive.

Table I below illustrates the condition of counter 23 for the first three channels.

*Table I*

| Input Impulse from Oscillator | Channel No. | Scale-of-32 Counter Stages | | | | | | | | | |
|---|---|---|---|---|---|---|---|---|---|---|---|
| | | 85 | | 86 | | 87 | | 88 | | 89 | |
| | | L | R | L | R | L | R | L | R | L | R |
| 0 | | 0 | X | 0 | X | X | 0 | 0 | X | 0 | X |
| 32 | | 0 | X | 0 | X | 0 | X | 0 | X | 0 | X |
| 64 | 1 | 0 | X | 0 | X | 0 | X | 0 | X | 0 | X |
| 92 | | 0 | X | 0 | X | 0 | X | 0 | X | 0 | X |
| 128 | 2 | 0 | X | 0 | X | 0 | X | 0 | X | 0 | X |
| 156 | | 0 | X | 0 | X | 0 | X | 0 | X | 0 | X |
| 198 | 3 | 0 | X | 0 | X | 0 | X | 0 | X | 0 | X |

X=conductive.
0=nonconductive.

At the instant of reset, the left-hand sections of the six stages of scale-of-60 counter 24 are nonconductive and right-hand sections conductive. Since the initial stage 101 of the scale-of-60 counter is a binary counter, it will reverse its state for every negative pulse fed to it from the final stage 89 of the scale-of-32 counter, that is, for every thirty-two impulses from oscillator 20. This is shown in Table II.

*Table II*

| Input Impulse | Channel | Scale-of-32 Counter Final Stage 89 | | Scale-of-60 Counter Initial Stage 101 | |
|---|---|---|---|---|---|
| | | L | R | L | R |
| 0 or 1,920 | | 0 | X | 0 | X |
| 32 | | 0 | X | X | 0 |
| 64 | 1 | 0 | X | 0 | X |
| 96 | | 0 | X | X | 0 |
| 128 | 2 | 0 | X | 0 | X |
| 160 | | 0 | X | X | 0 |
| 192 | 3 | 0 | X | 0 | X |

X=conductive.
0=nonconductive.

Similarly, the state of the second stage 102 of the scale-of-60 counter will be reversed for every two pulses fed to it from the first stage 101, that is, for every sixty-four impulses from oscillator 20, and so forth. The condition or state of the six stages 101 to 106 of the scale-of-60 counter for the first six channels is shown in Table III below.

*Table III*

| Input Impulse from Oscillator | Channel | Scale of-60-Counter Stages | | | | | | | | | | | |
|---|---|---|---|---|---|---|---|---|---|---|---|---|---|
| | | 101 | | 102 | | 103 | | 104 | | 105 | | 106 | |
| | | L | R | L | R | L | R | L | R | L | R | L | R |
| 0 or 1,920 | | 0 | X | 0 | X | 0 | X | 0 | X | 0 | X | 0 | X |
| 32 | | X | 0 | 0 | X | 0 | X | 0 | X | 0 | X | 0 | X |
| 64 | 1 | 0 | X | X | 0 | 0 | X | 0 | X | 0 | X | 0 | X |
| 96 | | X | 0 | X | 0 | 0 | X | 0 | X | 0 | X | 0 | X |
| 128 | 2 | 0 | X | 0 | X | X | 0 | 0 | X | 0 | X | 0 | X |
| 160 | | X | 0 | 0 | X | X | 0 | 0 | X | 0 | X | 0 | X |
| 192 | 3 | 0 | X | X | 0 | X | 0 | 0 | X | 0 | X | 0 | X |
| 224 | | X | 0 | X | 0 | X | 0 | 0 | X | 0 | X | 0 | X |
| 256 | 4 | 0 | X | 0 | X | 0 | X | X | 0 | 0 | X | 0 | X |
| 288 | | X | 0 | 0 | X | 0 | X | X | 0 | 0 | X | 0 | X |
| 320 | 5 | 0 | X | X | 0 | 0 | X | X | 0 | 0 | X | 0 | X |
| 352 | | X | 0 | X | 0 | 0 | X | X | 0 | 0 | X | 0 | X |
| 384 | 6 | 0 | X | 0 | X | X | 0 | X | 0 | 0 | X | 0 | X |

X=conductive.
0=nonconductive.

The plate circuits of the various stages of the scale-of-60 counter are connected to a series of corresponding crystal diode matrices 111 to 116, inclusive, by way of matrix selector leads 31. The plate of the left-hand section of stage 101 is permanently connected to a series of matrix buses 121, 122 and 123 through diodes 124, 125 and 126, respectively. Matrix buses 121, 122 and 123 are connected to B+ through resistors 97, 98 and 99, respectively. The output or plate circuits of either one section or the other of the remaining stages 102 to 106 may be connected to the matrix buses through corresponding diodes 134, 135, 136, and so forth, by means of toggle switches 137, 138 and 139, and so forth, respectively, whenever said switches are either in position 0 or 1. When a given switch is thrown to position 0, only the plate circuit of the left-hand section of a given stage is tied to the matrix bus corresponding to that switch, while, if the switch is at position 1, the right-hand section only of a given stage is tied to the matrix bus corresponding to that switch.

The number of matrix buses used depends upon the total number of channels which it is desired to select simultaneously; thus, in the example shown in Fig. 3, any combination of three channels may be selected.

Switches 141, 142 and 143 are closed (placed in the "in" position) whenever it is desired to transmit the channel corresponding to the switch so closed. For example, if transmission of three different channels simultaneously is desired, switches 141, 142 and 143 will all be closed, whereas, if transmission of only one channel is desired at a given time, only one of these switches need be closed, and so forth.

Each of the matrix buses 121 to 123 is connected through switches 141 to 143 and a mixer 28 consisting of diodes 146 to 148, respectively, to lead 149 which connects the selected channel pulse or pulses to a gate amplifier 150 having an even number of stages from which large amplitude positive gate pulses are obtained. These gate pulses are used to drive relay amplifier 151 in whose plate circuit is connected a high speed relay 152. Relay amplifier 151 is normally nonconductive and coil 153 of relay 152 is therefore de-energized. During the time of application of the positive gate pulses to relay amplifier 151, this amplifier is rendered conductive and relay coil 153 becomes energized. Armature 154 of relay 152 is then actuated so as to close the relay contacts. In this way those input pulses appearing on lead 155 which correspond in time with the closure of relay 152 are allowed to pass to the output terminals 30, 30.

Although an electronic gate may be used in lieu of an electromechanical relay, the latter has the advantages of no contact potential and no resistance variations because of aging and supply voltage variations.

Returning now to the counter-matrix circuit, when the left-hand section of stage 101 of counter 24 is conductive, the potential at the plate of the left-hand section will fall and the cathodes of diodes 124 to 126 will become sufficiently negative to alow these diodes to conduct, drawing current through their respective load resistors 97, 98 and 99 and the left-hand section of stage 101. This current flow through the conductive diodes will pull down the potential of the bus associated with the diode so conducting. In this case, the diodes 146 to 148 are nonconductive and no pulses are derived from the output of mixer 28.

When the left-hand of stage 101 is nonconductive, the potential at the plate of this section is sufficiently high to prevent conduction in diodes 124 to 126 and the potential of the matrix buses will rise sufficiently to allow diodes 146 to 148 to conduct. In this connection, it should be noted that the effect of the remaining stages 102 to 106 of the counter and their corresponding matrices has not yet been considered. It is obvious at this point, however, that the left-hand section of the first counter stage 101 must be nonconductive and the right-hand section conductive in order to derive positive gate pulses capable of allowing transmission of information to the channel selector output terminals.

By means of switches 137, 138 and 139, it is possible to selectively connect the output of either the left-hand section or the right-hand section of the second stage 102 of counter 24 to the cathodes of the respective diodes 134, 135 and 136. When the toggle switch 137 is in position 1, the right-hand section of stage 102 is connected via the corresponding selector leads to the cathode of diode 134 while the left-hand section is disconnected entirely from said diode. The anode of diode 134 is connected to the matrix bus 121.

When the right-hand section of stage 102 is conductive, the potential on the cathode of diode 134 is reduced so that diode 134 becomes conductive and the potential on matrix bus 121 decreases. Regardless of the condition of the other control stages, the conduction in diode 134 alone is sufficient to cut off diode 146 in mixer 28 and effectively open up matrix bus 121. Although the left-hand section of stage 102 is simultaneously nonconductive, this section is ineffective since there is no connection made to matrix bus 121 through switch 137.

If switch 137 is moved to position 0, assuming that the right-hand section of stage 102 is still conductive and the left-hand section nonconductive, the connection of the plate circuit of the right-hand section to diode 134 is broken and an electrically conductive path now established between the plate circuit of the left-hand section of stage 102 and the cathode of diode 134. Since, however, the left-hand section is nonconductive, diode 134 will be cut off and there will be no drop of potential across resistor 97 to pull down the potential on bus 121.

Switches 138 and 139 similarly serve to connect either one section or the other of stage 102 through diodes 135 and 136, respectively, to matrix buses 122 and 123, respectively.

The succeeding stages 103 to 106 of the scale-of-60 counter are connected to the matrix elements 113 to 116, respectively, which operate in the same manner as the matrix element of stage 102.

In order for a given matrix bus to rise in potential high enough to permit conduction of its mixer diode and, therefore, at a potential sufficient to produce a gate pulse for closure of the gate circuit interposed between the input and output terminals of the device, each and every one of the five crystals of matrix elements 112 to 116 associated with a given bus must be connected to a point which rises in voltage. In other words, every one of the nonconductive sections of the various stages of the scale-of-60 counter must be connected to the switches corresponding to a given matrix bus.

The sections which are instantaneously nonconductive depend upon the number of trigger pulses applied to the counter after reset. Knowing how the counter cycles (see Table III), it is possible to set up the five switches 137, 137′, 137″, etc., or 138, 138′, etc., or 139, 139′, etc., to select a combination of five plate circuits which rise in potential coincident with any desired channel pulse. For example, suppose it is desired to select the fifth channel. A glance at Table III will indicate that the left-hand sections of the second and fourth stages 102 and 104 of the scale-of-60 counter are conductive and the right-hand sections nonconductive. The state for the third, fifth and sixth stages is the reverse of the second and fourth stage, that is, their left-hand sections are nonconductive. In order to tie all nonconductive sections of the five stages 102 to 106 to diodes 134, 134′, 134″ and so forth, it is necessary to set up switches 137, 137′, 137″ and so forth, to the positions 1, 0, 1, 0, 0, respectively. With the switches thus set up, matrix bus 121 will rise in potential sufficiently to permit mixer diode 146 to conduct and a positive gate pulse will be derived from mixer 28. This positive pulse, after amplification in gate amplifier 151, will close the relay gate and allow the fifth channel pulse to pass through leads to the output terminals 30, 30 of the device.

It is obvious that, instead of using matrix bus 121, matrix 122 could have been raised in potential to allow conduction in diode 147 and permit a positive gate pulse corresponding to the fifth channel in time to be derived at the output of mixer 28. Likewise, bus 123 could have been used instead of buses 121 or 122.

From an inspection of Table III it is now evident that two channels, such as the third and fifth channels, could be simultaneously transmitted by leaving switches 137, 137′, and so forth, in the position just mentioned and by setting up switches 138, 138′, and so forth, to the positions, 1, 1, 0, 0, 0, respectively. Positive pulses spaced in time by two channel widths would then be derived at the output of both diodes 146 and 147 of mixer 28 for application to the relay gate. The third and fifth channels could be simultaneously selected by utilization of buses 121 and 123 or buses 122 and 123 instead of buses 121 and 122.

The number of channels that may be transmitted simultaneously, as previously stated, is limited only by the independent buses, such as 121, 122 or 123, with the associated sets of switches, diodes and selector leads composing a matrix.

The reset coupling networks 161 . . . 165 of the scale–of–32 counter 22 and 171, 173, 174, and so forth, of stages 101 to 106 of scale–of–60 counter 23 are all connected to the left-hand section of these stages by way of conductor 180, one end of which is connected to the output of the synchronizing separator and shaper circuit 12. The entire counter chain 22, including the scale–of–32 counter 23 and the scale–of–60 counter 24, is reset to a count of zero for each frame-synchronizing pulse.

In Fig. 4 a modification of the channel separator described in Figs. 1 to 3 is shown in which elements corresponding to those of Figs. 1 to 3 are indicated by like reference numerals.

The output of the scale–of–32 counter 23 is applied to a counter-matrix circuit 24, 26, as in Figs. 1 to 3.

In the modification shown in Fig. 4, however, the gate pulses produced on the matrix buses corresponding to the desired channels, instead of being combined before application to a single electronic or electromechanical gate, are applied to individual gates to which corresponding separate output terminals are connected.

As shown in the modification of Fig. 4, a plurality of separate matrix buses 31*a*, 31*b* . . . 31*m* are associated with selection matrix 26 and separate gates 29*a*, 29*b* . . . 29*m* are interposed between the corresponding buses 31*a* . . . 31*m* and individual output terminals 30*a* . . . 30*m*. In this manner, only one information channel appears at each output terminal.

As in the embodiment shown in Figs. 1 to 3, the number of matrix buses used depends upon the total number of channels which it is desired to select simultaneously.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An electronic commutated channel separator having input and output terminals and adapted to selectively transmit therebetween a desired channel of communication in the form of pulses from recurring multiple channel trains of signal pulses, each of said trains of pulses including a synchronizing pulse followed by a plurality of channel pulses, comprising means responsive only to said synchronizing pulses for producing a control voltage which is a direct function of the period between successive synchronizing pulses, a generator of electrical energy whose frequency is maintained at a multiple of said period in response to said control voltage, electronic counter means receptive of said electrical energy for producing pulses which have substantially the same recurrence frequency as said synchronizing pulses, selectortor means adapted to be selectively connected to said counter means in accordance with the channel desired, said selector means being productive of an impulse corresponding in phase and duration to said desired channel, a gate circuit interposed between said input and output terminals and responsive to said impulse for effecting transmission of said desired channel between said input and output terminals.

2. An electronic commutated channel separator having input terminals and a plurality of separate output terminals and adapted to selectively transmit therebetween desired channels of communication in the form of pulses from recurring multiple channel trains of signal pulses, each of said trains of pulses including a synchronizing pulse followed by a plurality of channel pulses, comprising means responsive only to said synchronizing pulses for producing a control voltage which is a direct function of the period between successive synchronizing pulses, a generator of electrical energy whose frequency is maintained at a multiple of said period in response to said control voltage, electronic counter means receptive of said electrical energy for producing pulses which have substantially the same recurrence frequency as said synchronizing pulses, selector means adapted to be selectively connected to said counter means in accordance with the channels desired, said selector means being productive of impulses corresponding in phase and duration to said desired channels, gating means interposed between said input and output terminals and responsive to said impulses for effecting transmission of said desired channels between said input terminals and said output terminals.

3. An electronic commutated channel separator having input terminals and a plurality of output terminals and adapted to selectively transmit therebetween desired channels of communication simultaneously in the form of pulses from recurring multiple channel trains of signal pulses, each of said trains of pulses including a synchronizing pulse followed by a plurality of channel pulses, comprising means responsive only to said synchronizing pulses for producing a control voltage which is a direct function of the period between successive synchronizing pulses, a generator of electrical energy whose frequency is maintained at a multiple of said period in response to said control voltage, electronic counter means receptive of said electrical energy for producing output pulses which have substantially the same recurrence frequency as said synchronizing pulses, selector means adapted to be selectively connected to said counter means in accordance with the channels desired, said selector means being productive of impulses corresponding in phase and duration to said desired channels, a plurality of gate circuits equal in number to the maximum number of channels to be simultaneously selected and interposed between said input terminals and said corresponding output terminals and responsive to said impulses for effecting simultaneous transmission of said desired channel between said input terminals and said corresponding output terminals.

4. An electronic commutated channel separator having input and output terminals and adapted to selectively transmit therebetween a desired channel of communication in the form of pulses from recurring multiple channel trains of signal pulses, each of said trains of pulses including a synchronizing pulse followed by a plurality of channel pulses, comprising means responsive only to said synchronizing pulses for producing a control voltage which is a direct function of the period between successive synchronizing pulses, a generator of electrical energy whose frequency is maintained at a multiple of said period in response to said control voltage, a counter chain comprising a plurality of counters and receptive of said electrical energy for producing pulses which have substantially the same recurrence frequency as said synchronizing pulses, matrix means associated with a portion of said plurality of counters and each comprising a plurality of matrix elements including a switch and a diode having a cathode and an anode, said switch being adapted to connect the output circuits of a single section of each counter of said portion of said binary counters to the cathode of said diode, said matrix means further including a matrix bus one end of which is connected through a resistor to a source of potential, means for connecting the anode of each of said diodes to said matrix bus, said matrix means being adapted to effect a rise in voltage on said matrix bus whenever all of said diodes are nonconductive, a gate circuit interposed between said input and output terminals and energized during said rise in voltage for effecting transmission of said desired channel between said input and output terminals.

5. An electronic commutated channel separator having input and output terminals and adapted to selectively transmit therebetween a desired channel of communication in the form of pulses from recurring multiple channel trains of signal pulses, each of said trains of pulses including a synchronizing pulse followed by a plurality of channel pulses, comprising means responsive only to said synchronizing pulses for producing a control voltage which is a direct function of the period between successive synchronizing pulses, a generator of electrical energy whose frequency is maintained at a multiple of said period in response to said control voltage, a counter chain comprising a plurality of counters and receptive of said electrical energy for producing pulses which have substantially the same recurrence frequency as said synchronizing pulses, matrix means associated with a portion of said counters and each comprising a plurality of matrix elements including a switch and a diode having a cathode and an anode, said switch being adapted to connect the output circuits of a single section of each counter of said portion of said plurality of counters to the cathode of said diode, said matrix means further including a plurality of matrix buses one end of each of which is connected to the positive terminal of a source of direct current voltage, means for connecting the anode of each of said diodes to one of said matrix buses, said means being adapted to effect a rise in voltage on a given matrix bus whenever all of said diodes associated therewith are nonconductive, a gate circuit interposed between said input and output terminals and energized during said rise in voltage for effecting transmission of said desired channels between said input and output terminals.

6. An electronic commutated channel separator having input terminals and a plurality of pairs of output terminals and adapted to selectively transmit therebetween desired channels of communication in the form of pulses from recurring multiple channel trains of signal pulses, each of said trains of pulses including a synchronizing pulse followed by a plurality of channel pulses, comprising means responsive only to said synchronizing pulses for producing a control voltage which is a direct function of the period between successive synchronizing pulses, a generator of electrical energy whose frequency is maintained at a multiple of said period in response to said control voltage, a counter chain comprising a plurality of counters and receptive of said electrical energy for producing pulses which have substantially the same recurrence frequency as said synchronizing pulses, matrix means associated with a portion of said binary counters and each comprising a plurality of matrix elements including a switch and a diode having a cathode and an anode, said switch being adapted to connect the output circuits of a single section of each counter of said portion of said plurality of counters to the cathode of said diode, said matrix means further including a plurality of matrix buses one end of each of which is connected to the positive terminal of a source of direct current voltage, means for connecting the anode of each of said diodes to one of said matrix buses, said matrix means being adapted to effect a rise in voltage on said matrix bus whenever all of said diodes are nonconductive, a plurality of gate circuits interposed between said input terminals and said corresponding pairs of output terminals and energized during said rise in voltage of said corresponding matrix bus for effecting transmission of said desired channel between said input terminals and said corresponding pairs of output terminals.

References Cited in the file of this patent

UNITED STATES PATENTS

| | | |
|---|---|---|
| 2,471,138 | Bortelink | May 24, 1949 |
| 2,508,620 | Peterson | May 23, 1950 |
| 2,537,056 | Hoeppner | Jan. 9, 1951 |
| 2,541,932 | Melhose | Feb. 13, 1951 |
| 2,570,716 | Rochester | Oct. 9, 1951 |
| 2,609,451 | Hansen | Sept. 2, 1952 |

UNITED STATES PATENT OFFICE

CERTIFICATE OF CORRECTION

Patent No. 2,834,833 May 13, 1958

Carl A. Segerstrom et al.

It is hereby certified that error appears in the printed specification of the above numbered patent requiring correction and that the said Letters Patent should read as corrected below.

Column 12, line 45, after "said" insert -- matrix --.

Signed and sealed this 8th day of July 1958.

(SEAL)

Attest:

KARL H. AXLINE

Attesting Officer

ROBERT C. WATSON

Commissioner of Patents